United States Patent
Guan

(10) Patent No.: US 8,340,668 B2
(45) Date of Patent: Dec. 25, 2012

(54) METHOD, DEVICE AND SYSTEM FOR PAGING TERMINAL DEVICE ACROSS HETEROGENEOUS NETWORKS

(75) Inventor: Hongguang Guan, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 683 days.

(21) Appl. No.: 12/426,402

(22) Filed: Apr. 20, 2009

(65) Prior Publication Data

US 2009/0201842 A1 Aug. 13, 2009

Related U.S. Application Data

(63) Continuation of application No. PCT/CN2007/002195, filed on Jul. 18, 2007.

(30) Foreign Application Priority Data

Oct. 20, 2006 (CN) .......................... 2006 1 0140280

(51) Int. Cl.
H04W 4/00 (2009.01)
H04W 36/00 (2009.01)
H04M 1/00 (2006.01)
H04B 7/00 (2006.01)
H04L 12/28 (2006.01)

(52) U.S. Cl. ..................... 455/434; 455/444; 455/552.1; 455/553.1; 370/310; 370/395.21

(58) Field of Classification Search .................. 455/434, 455/444, 552.1, 553.1; 370/310, 395.52, 370/395.21

See application file for complete search history.

(56) References Cited

U.S. PATENT DOCUMENTS

| | | | |
|---|---|---|---|
| 2003/0050090 A1* | 3/2003 | Raffel et al. | 455/552 |
| 2004/0185879 A1* | 9/2004 | Kong et al. | 455/458 |
| 2005/0192034 A1* | 9/2005 | Munje | 455/458 |
| 2006/0230151 A1 | 10/2006 | Kim et al. | |

(Continued)

FOREIGN PATENT DOCUMENTS

EP 1569487 A1 8/2005

(Continued)

OTHER PUBLICATIONS

Supplementary European Search Report dated (mailed) Oct. 27, 2010, issued in related Application No. 07785137.6-2412, PCT/CN2007002195, filed Jul. 18, 2007, Hauwei Technologies Co., Ltd.

(Continued)

*Primary Examiner* — Ariel Balaoing
(74) *Attorney, Agent, or Firm* — Finnegan, Henderson, Farabow, Garrett & Dunner, LLP

(57) ABSTRACT

A method for paging a terminal device across heterogeneous networks, where networks using different wireless standards send paging messages and location management information, and thus the load terminal devices can be alleviated and wireless resources occupied can be reduced. The method includes: selecting, by a current network, another network to execute a paging procedure, when receiving user data and determining a corresponding communication interface of the terminal device in the current network to be in a Dormant Mode, where the another network uses wireless standards different from the current network; sending, by the another network, a paging message to the terminal device to enable the terminal device to reconnect to the current network. A terminal device and network system is also provided.

11 Claims, 13 Drawing Sheets

U.S. PATENT DOCUMENTS

| | | | |
|---|---|---|---|
| 2006/0240799 A1* | 10/2006 | Kim et al. | 455/343.2 |
| 2007/0173283 A1* | 7/2007 | Livet et al. | 455/552.1 |
| 2007/0238482 A1* | 10/2007 | Rayzman et al. | 455/552.1 |

FOREIGN PATENT DOCUMENTS

| | | |
|---|---|---|
| WO | WO-2006052805 | 5/2006 |
| WO | WO2006/101369 | 9/2006 |
| WO | WO-2006109965 | 10/2006 |
| WO | WO-2006109976 | 10/2006 |

OTHER PUBLICATIONS $3^{rd}$ Generation Partnership Project; Technical Specification Group Services and System Aspects: Architecture—S2#52, S2-061290, "Fast Mobile IP based handover between 2GPP and non 3GPP access systems" May 2006.

Written Opinion of the International Searching Authority (translation) dated (mailed) Oct. 18, 2007, issued in related Application No. PCT/CN2007/002195, filed Jul. 18, 2007, Huawei Technologies Co., Ltd.

Third Chinese Office Action dated (mailed) Aug. 5, 2011, issued in related Chinese Application No. 200610140280.1 Huawei Technologies Co., LTD.

European Patent Office Communication pursuant to Article 94(3) EPC, dated (mailed) Nov. 22, 2011, issued in related European Application No. 07785137.6, Huawei Technologies Co., Ltd., 7 pages.

* cited by examiner

METHOD, DEVICE AND SYSTEM FOR PAGING TERMINAL DEVICE ACROSS HETEROGENEOUS NETWORKS

CROSS REFERENCE TO RELATED APPLICATIONS

This application is a continuation of International Application No. PCT/CN2007/002195, filed on Jul. 18, 2007, which claims the benefit of Chinese Patent Application No. 200610140280.1, filed on Oct. 20, 2006, both of which are hereby incorporated by reference in their entireties.

FIELD OF THE INVENTION

The present invention relates to communication technology, and more particularly, to a wireless communication method, device and system for paging a terminal device across heterogeneous networks.

BACKGROUND OF THE INVENTION

In order to save power of mobile devices as well as network resources, a mobile terminal is in an "Idle Mode" when it does not send data, which is also known as "Dormant Mode". In this mode, there are no links for sessions between the mobile terminal and the network, and thus no wireless resource is used.

In the Idle Mode, the location of the mobile terminal is still necessary to be detected by the network so that the mobile terminal can be waken up into an Active Mode when data needs to be transmitted from the network to the mobile terminal. When the mobile terminal needs to transmit data, it can also return to the Active Mode initiatively. Existing methods for implementing an Idle Mode are illustrated as follows.

1. The mobile terminal monitors a fixed broadcasting channel or paging channel, to acquire network information and parameters of the current location of the mobile terminal. The network information includes a paging group identifier (PG ID) that represents a paging range to which the current location belongs.

2. The mobile terminal updates its location periodically or at a time determined based on detection of network information, so that the network can obtain the latest location information of the mobile terminal.

3. When the network has data to be transmitted, the network may perform a paging procedure in a control channel of the latest location area. The paging message carries the paged terminal information. The mobile terminal in the Idle Mode constantly monitors the message. Once the mobile terminal detects that it is being paged, it enters the Active Mode, and establishes with the network a link used for data transmission and mobile management, and returns to a normal communication state.

Media Independent Handover is also known as MIH. The purpose of providing heterogeneous network handover service is to provide a handover procedure between media of different types, so that a client device can select the best network link automatically when roaming among networks and switch voice channels seamlessly without the user's intervention.

To realize seamless and continuous handover, the MIH is introduced in the existing protocols. Referring to FIG. 1, the MIH is logically defined as a thin layer in the mobility management protocol stack of the terminal device and network and plays a role of an assistant and booster in a handover decision. The upper layer makes a handover decision and link selection based on the input from MIH and the context, and MIH provides the upper layer with some necessary information on handover decision and on how to make the handover decision effectively. An MIH protocol stack mainly includes:

MIH Event Service (MIH-ES), providing event classification, event filtering, and event report of dynamic change events related to link characteristic, link state, and link quality;

MIH Command Service (MIH-CS), providing an MIH user with link operations related to mobility including management, control, and handover; and MIH Information Service (MIH-IS), providing detailed information of characteristics and services of a serving network and surrounding networks. The information is used for effective system access and handover decision.

The overall architecture model of the MIH is shown in FIG. 2. The MIH provides the upper layer with a universal service interface, the service primitives of the universal interface are independent of the specific protocol stacks of the different access technologies underneath, i.e., the lower layer access technologies are masked. The MIH communicates with the lower layer mobility management protocol stack via a specific interface.

FIG. 3 shows how the system provides the Information Service (IS) in the MIH. The MIIS (MIH IS) serves for handover, and provides a mechanism to discover and acquire the network information within a certain geographic area, including mainly the following functions:

(1) MIIS mainly provides a set of Information Elements (IEs), information structure and representation, inquiry and response mechanism of information transmission;

(2) MIIS may be placed in an MIH function entity, or in an information server;

(3) MIIS information can be acquired via the lower layer or the upper layer; the definition of the information structure may be in XML;

(4) The information can be static, such as a neighbor report; or dynamic, such as link layer parameters (channel information, MAC address, security information, etc.);

(5) MIIS defines a universal representation method for information transmission between different access technologies, such as using a standard format: XML or ASN.1;

(6) MIH-IS provides global information of the network for an MIH user and peer entities. The information is static (i.e. maintainable by the network management), and covers the characteristics and capabilities of the current and surrounding networks, as well as available access networks. The MIH user and the peer entities may use the information for access and handover decision. When maintenance is made by a service provider, the MIH-IS may also be used as a warehouse including handover policy, access priority rule and roaming information, etc. The MIH-IS is a key input in making handover decision.

(7) MIH-IS may receive information from and send information to the MIH layer of a network. The MIH-IS may maintain a profile of the network end in the database. The MIH layer in the terminal devices may acquire from the profile the information of available network for access. The global information can be acquired from the current access point.

MIS-CS command refers to a command issued from the upper layer to the lower layer, including commands from the upper layer to the MIH (such as from the upper layer mobility management protocol stack to the MIH, from the policy engine to the MIH, etc.) and from MIH to the lower layer (MIH to MAC, the MIH to PHY, etc), as well as commands from the local terminal MIH entity to the remote terminal MIH entity. A command mainly carries some instructions that the upper layer makes for the lower layer of the local or peer terminal to control some activities of the lower layer.

MIH events include local events and remote events. The local events are usually sent from the MIH layer to layer 3 mobile protocol layer (L3MP) via a L2 data link (MAC, Radio Link, etc). The remote events are usually sent from the MIH to the peer layer.

Because data links can not be established between different media, the MIH can not support the transmission of remote events between protocol stacks of two media of different types. An event is typically used for handover purposes. The MIH-ES allows the user to receive a notification of the current status and status change of the lower layer transmission link; MIH-ES provides a universal notification interface of link status, and allow the user to make certain personal customization. A typical event is an event for handover detection created for L3MP. For example, an event indicates that in the near future a link will stop transmitting MAC SDUs, L3MP will use this event to prepare to select a new access point before the current link stops transmission, which will reduce the handover time. The events include: Link Up, Link Down, Link Parameters Change, Link Going Down, L2SDU Transmission Status, Link Event Rollback, Pre trigger (L2 Handoff Imminent), etc. The source of an event can be L2 data link (MAC, RRM, etc., different for various access technologies), PHY, or MIH. The destination of the event can be a local or remote MIH, or both. The destination of the event is decided dynamically by a registering mechanism. The receiver of an event can register interested events.

IP Paging may provide management of a user's Dormant Mode, and a mechanism of paging the user in the Dormant Mode. The technology establishes a logical entity in a packet network to manage location information of mobile terminals (or terminal devices) in the Dormant Mode. In the IP Paging technology, location updates and paging messages are transmitted via IP messages. Therefore, an interface of the terminal device shall be able to transmit the IP messages; however, the interface can not transmit the IP messages in the Idle Mode. As the mechanism does not take into consideration the effect of Layer 2 characteristics on media independent paging mechanism, the interface has to be awakened from Dormant Mode to establish an IP connection with the network for transmitting paging messages and location management information. Therefore, load of the mobile terminal is increased and the wireless resource is occupied.

SUMMARY OF THE INVENTION

Various embodiments of the invention provide a method, device, and system for paging a terminal device across heterogeneous networks, so that paging messages and location management information can be transmitted by networks using different wireless standards, and the load of the terminal devices and usage of wireless resource can be reduced.

The technical solutions according to the embodiments of the invention are as follows.

A method for paging a terminal device across heterogeneous networks, includes:

selecting, by a current network, another network to execute a paging procedure, when the current network, upon receipt of user data, determines that a communication interface of the terminal device in the current network is in a Dormant Mode, wherein the another network uses different wireless standards from the current network; and sending, by the another network, a paging message to the terminal device to enable the terminal device to reconnect to the current network.

A method for updating location information of a terminal device across heterogeneous networks, includes:

when a paging area of the terminal device in a current network is changed, selecting, by the terminal device, another network using different wireless standards from the current network, and sending to a communication interface of the another network a location update request to update location information of the terminal device in the current network; and sending, by the another network, the received location update request to the current network for location update.

A method for realizing entry into a Dormant Mode across heterogeneous networks, includes:

sending, by a network where the terminal device is located, a request message to another selected network, to instruct a communication interface of the terminal device to enter the Dormant Mode, wherein the another network uses a different wireless standard from the network where the terminal device is located; and initiating, by the another network having received the request message, a procedure for entering the Dormant Mode, to enable the communication interface of the terminal device to enter the Dormant Mode.

A terminal device, includes:

a plurality of communication interfaces, adapted to interact respectively with networks that use various wireless standards; and a control module, adapted to control, when one of the plurality of communication interfaces receives a paging message, another communication interface in a Dormant Mode to enter an Active Mode and reestablish a data link with a corresponding network, or/and when information on a location of the terminal device in a network needs to be updated, selecting another communication interface to send an update request message if the one communication interface s in the Dormant Mode.

An apparatus for use in a network, includes:

a module adapted to, when a communication interface of a terminal device receiving data in the network is determined to be in a Dormant Mode, select another network that uses a different wireless standard from a network where the terminal device is located; and a module adapted to instruct the selected further network to execute a paging procedure.

A network system, includes:

a network device adapted to select another network that uses a different wireless standard from a network where a terminal device is located when a communication interface of a terminal device receiving data in the network where the terminal device is located is determined to be in a Dormant Mode, and to instruct the another network to send a paging message; and the terminal device adapted to enable the communication interface to enter an Active Mode and reestablish a data link with a corresponding network when receiving the paging message.

According to the embodiments of the invention, when the current network determines a communication interface of the terminal device is in the Dormant Mode, a paging message is sent to the terminal device via another network that uses a different wireless standard. Therefore, paging messages can be communicated without awakening the communication interface in the Dormant Mode to establish an IP connection at the wireless access side. Thereby, link features and the framework provided by the existing MIH service can be sufficiently used and the load of the terminal device can be reduced.

DETAILED DESCRIPTION OF THE EMBODIMENTS

An embodiment of the invention uses a media independent switch MIH architecture to provide a function of paging and Dormant Mode across heterogeneous networks, so as to alleviate the load of a terminal device (also known as Mobile Station (MS)).

For the sake of convenience, the function of media independent paging and Dormant Mode is referred to as MI-Paging (Media Independent Paging and Dormant Mode or MI-P) in the following.

The embodiment uses Command Service, Event Service, and Information Service provided by Media Independent Handover Service (MIHS) to carry parameters and action instructions for Paging and Idle Mode required in wireless access technologies of various standards, so as to realize the function of paging and Idle Mode across heterogeneous networks.

Figure 1:
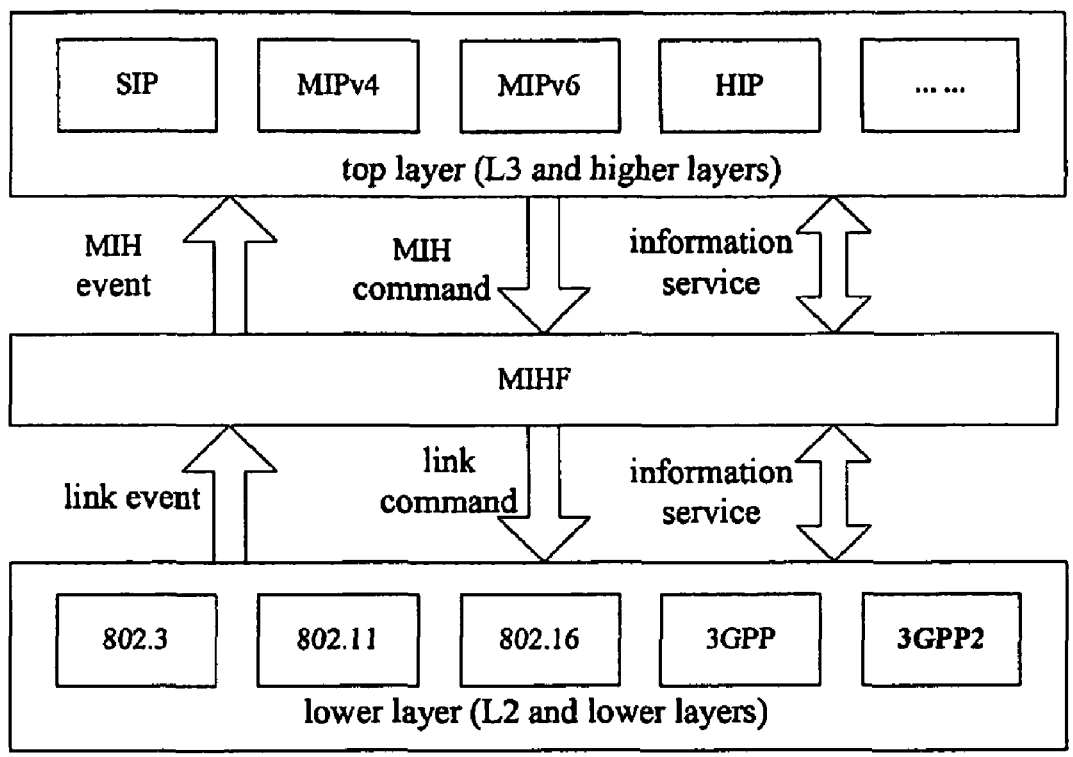
FIG. 1 is a schematic diagram of location of an MIH in a system in the prior art.
Figure 2:
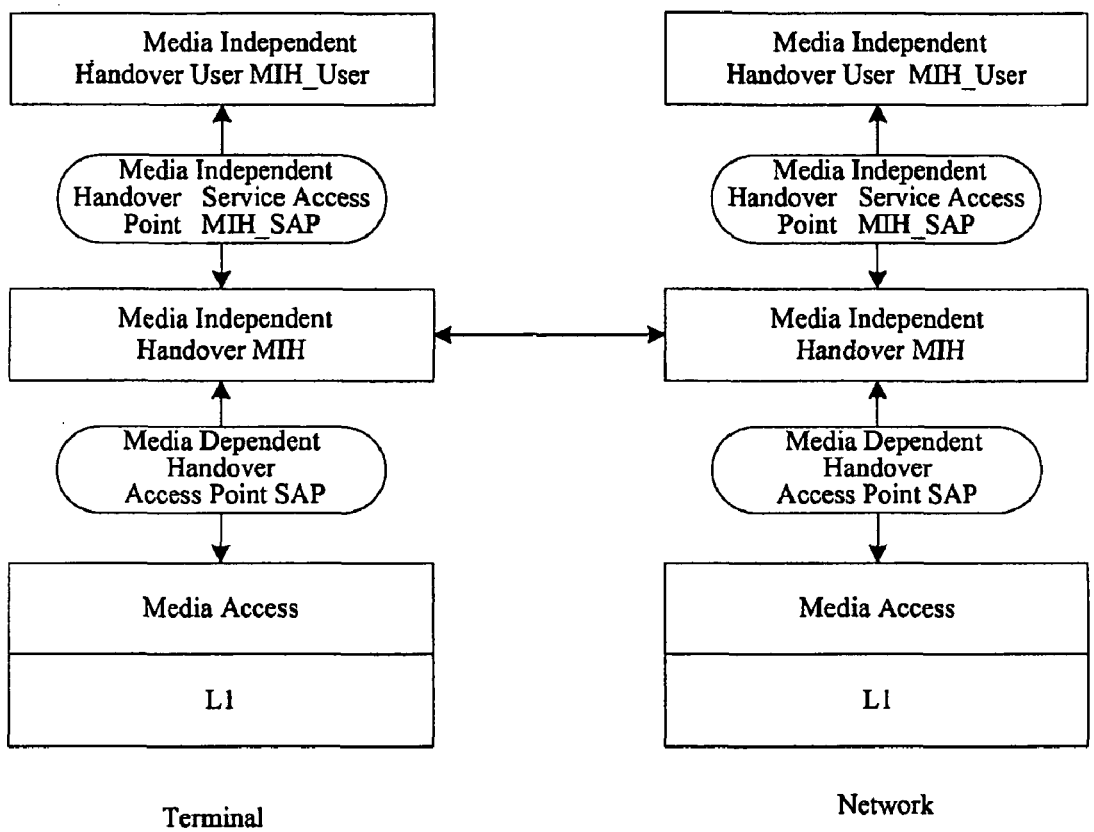
FIG. 2 is a schematic diagram of an overall architecture model of the MIH in the prior art.
Figure 3:
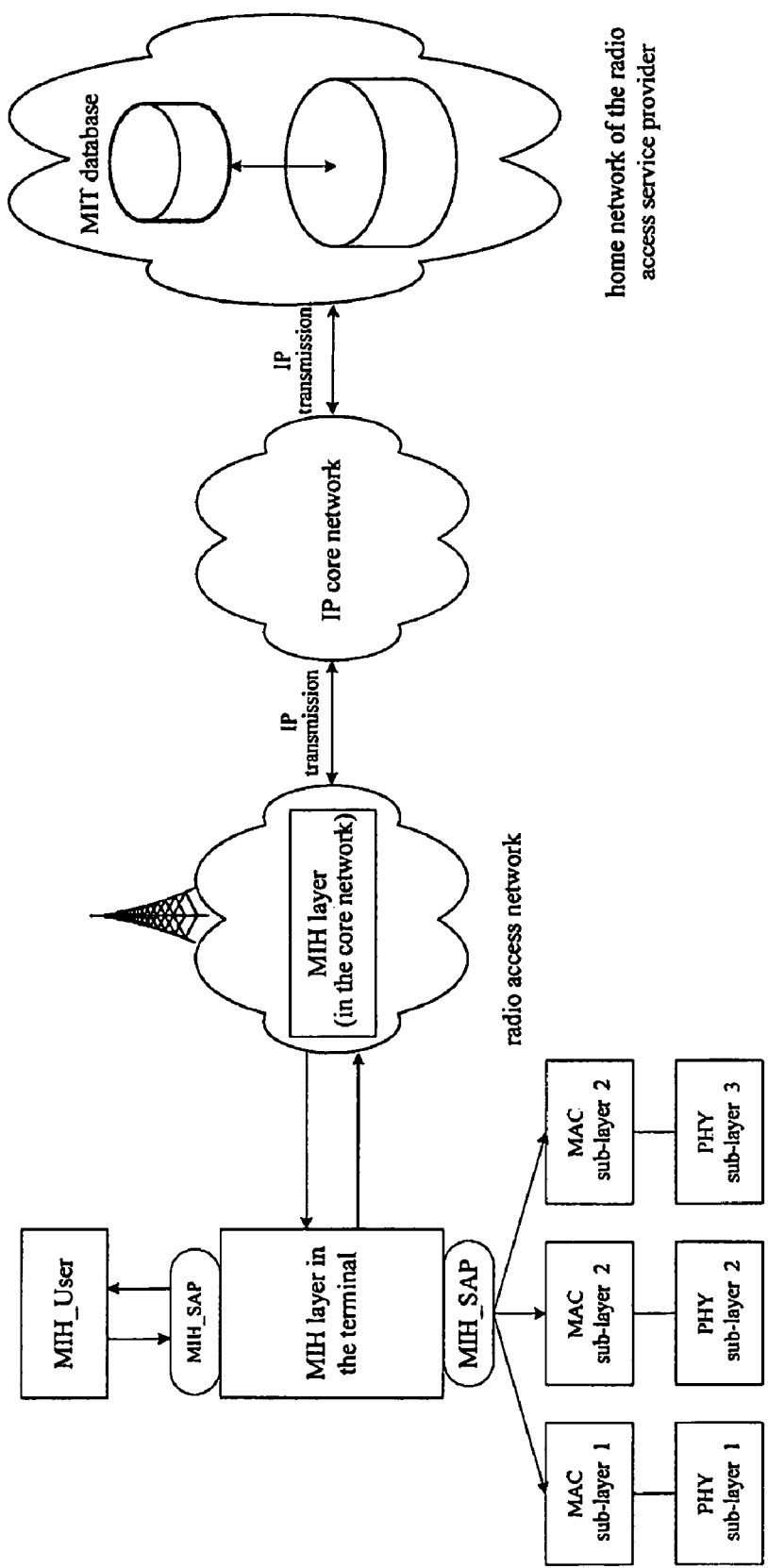
FIG. 3 is a schematic diagram of a system providing an MIH-IS in the prior art.
Figure 4:
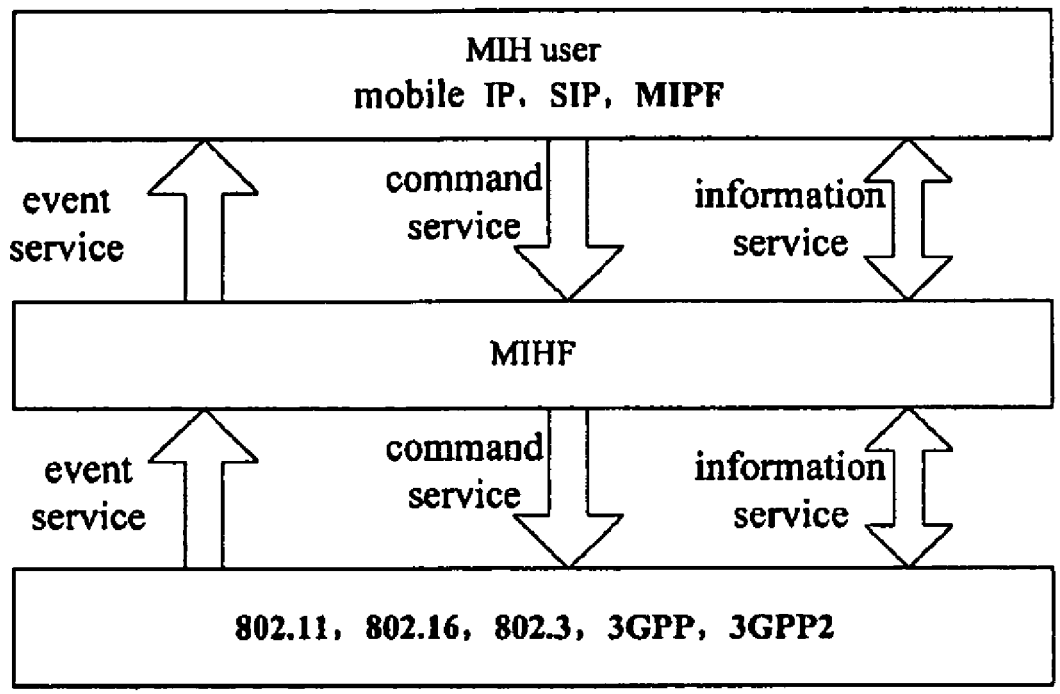
FIG. 4 is a schematic diagram of positional relation between a media independent paging and the MIH according to an embodiment of the invention.

In the embodiment, the positional relation between MI-Paging and MIH is shown in FIG. 4. MI-Paging Function (MIPF) is present as a customer of the MIH Function (MIHF). The MIH provides MIPH with the Event Service (ES) and Information Service (IS). The MIPF provides the MIHF with the Command Service (CS).

Figure 5:
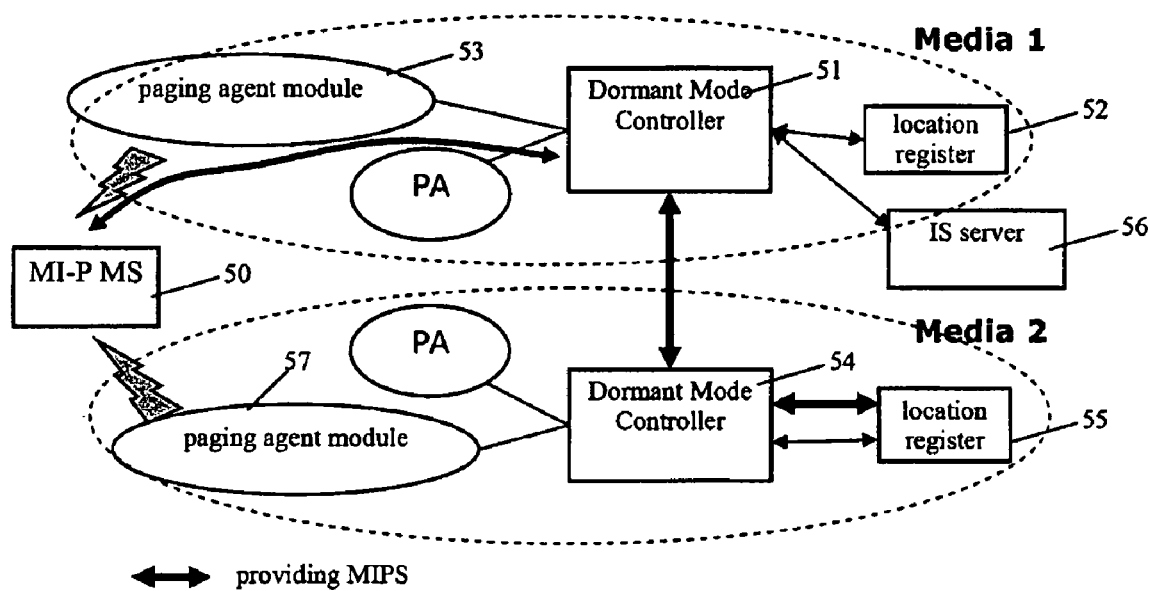
FIG. 5 is a schematic diagram of a system providing the media independent paging according to an embodiment of the invention.

A network system for realizing the function of media independent paging in the embodiment is shown in FIG. 5. The system includes two networks using different wireless standards (i.e., two different media networks), i.e., Media1 and Media2 (not limited to two), a multimode terminal device MS 50, information server IS Server 56 (although the figure shows only one terminal device, there may be a plurality of terminal devices in the system). The terminal device 50 provides the MI-Paging function. Each network includes a Dormant Mode Controller (DMC), a Media Independent Paging Location Register (MI-P LR), and a Media Independent enabled Paging Agent (MI-P PA). A number of DMCs and LRs (not shown in the figure) may exist in each network based on the actual network configuration.

The Dormant Mode Controllers 51, 54 have the function of media independent paging, and manages activities of the mobile terminal 50 in the Dormant Mode across heterogeneous networks through the MIH service. In a single media network, the location information of the terminal device 50 is maintained by only one DMC, which is referred as Anchor DMC of the terminal device. Based on area or management relation, individual DMC maintains respective location information of the terminal device.

MI-P PAs 53, 57 are logic entities located in a base station, which performs media independent paging function by interacting with a paging controller.

MI-P LRs 52, 55 interacts with the DMC to store information on location update made by the terminal device 50 and provide a query service.

In order to reasonably narrow the range in which the paging message is sent, a number of Paging Agents (PA) are divided into paging areas (or paging groups) for management. Each of the paging areas has a Paging Area ID, indicating a location range in which a terminal device is located.

Typically, Media1 in FIG. 5 may be a WIMAX network, Media2 is a 3GPP network, and the mobile terminal 50 provides access interfaces with the two networks. In the system, 3GPP network can carry out the paging and Dormant Mode control over the WIMAX network via an WIMAX interface of the terminal device, i.e., 3GPP network can send location update messages and network-paging-terminal messages via the connected WIMAX interface in the Active Mode, so as to prevent the resource consumption of the 3GPP interface in the Idle Mode. Similarly, the WIMAX network can perform the paging and Dormant Mode control over the 3GPP network via the 3GPP interface of the terminal device.

Figure 6:
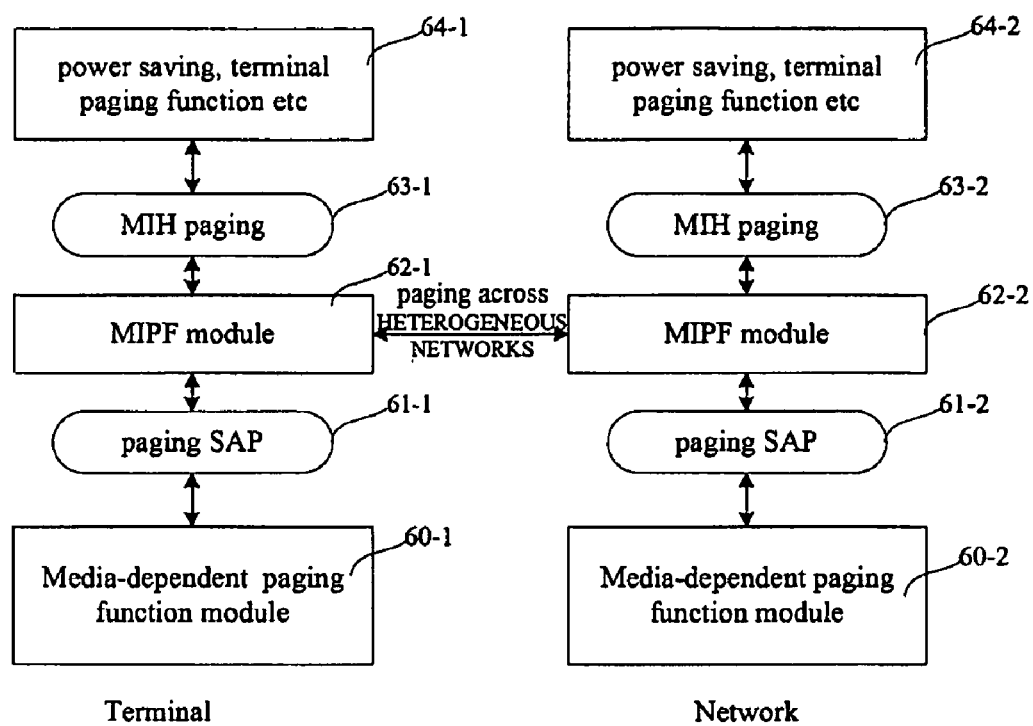
FIG. 6 is a schematic diagram of the location of the media independent paging function module in a terminal and network node system.

The positions of the MIPF module in the terminal device and the network are shown in FIG. 6. Media specific paging function modules 60-1, 60-2 provide universal Paging Service Access Point (SAP) 61-1, 61-2 (i.e. interface) via MIPFs 62-1, 62-2; MIPFs 62-1, 62-2 provide Power-saving and Remote Paging Function, etc in the upper layer modules 64-1, 64-2 with universal interfaces 63-1, 63-2.

As can be seen from FIG. 5 and FIG. 6, the information on the location of the multimode terminal equipped with various access technologies in the multi-medium networks can be sent among MIPFs in the MIH architecture.

Figure 7:
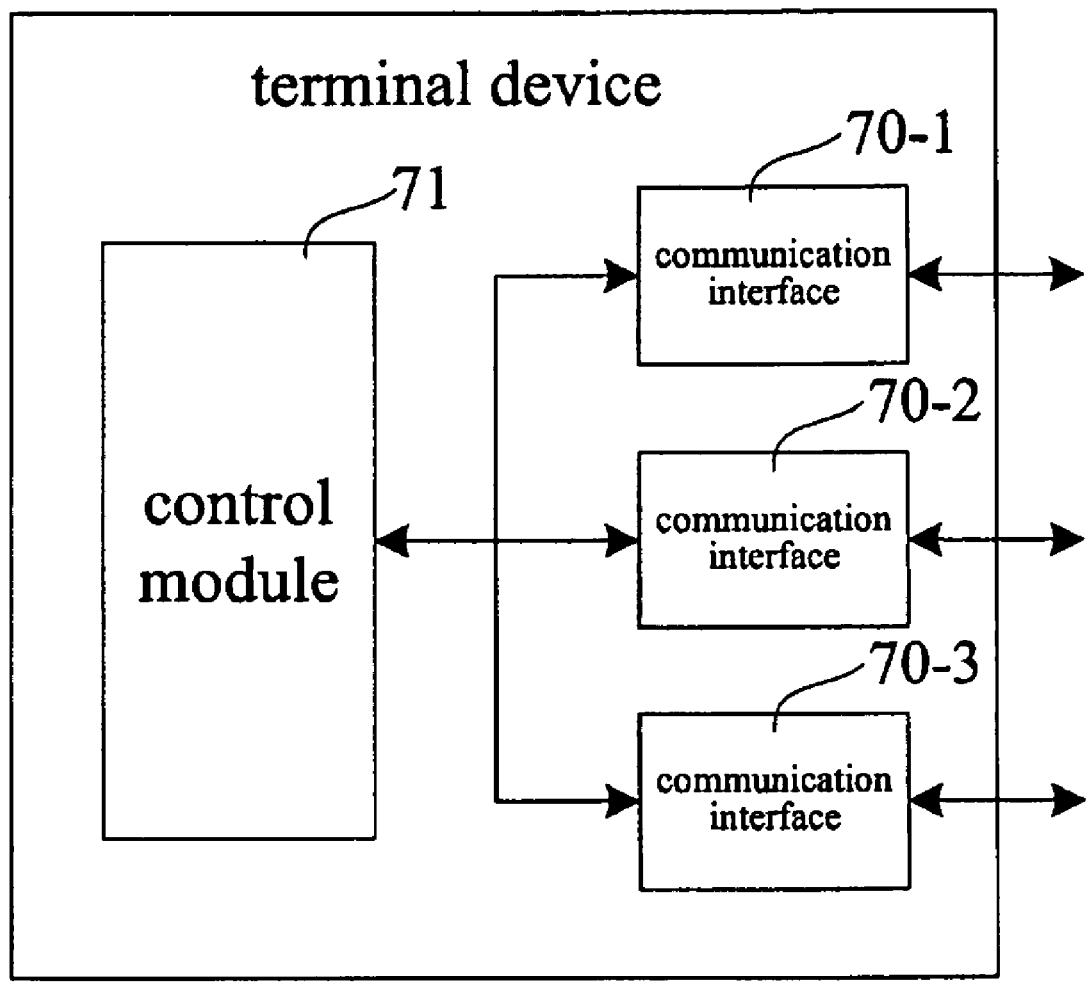
FIG. 7 is a structure schematic diagram of a terminal device according to an embodiment of the invention.

With reference to FIG. 7, the terminal device in the embodiment includes: a control module 71, and a number of media specific communication interfaces 70-1, 70-2, 70-3 (other modules performing the existing basic functions are not shown) connected with the control module 71. The control module 71 can be an MIHF module, or other modules that can also perform MIHF. When the control module 71 has received a paging message at the communication interface (e.g. the communication interface 70-1) and detects that the paging message belongs to a network including another communication interface in the Dormant Mode (e.g. communication interface 70-3), the control module controls the corresponding communication interface (e.g. communication interface 70-3) to quit the Dormant Mode and enter the Active Mode, thereby reestablish a data link with the corresponding network. When the terminal device needs to update its location information in the network, if the corresponding communication interface (e.g. communication interface 70-2) is in the Dormant Mode, then the control module 71 selects another communication interface in the Active Mode (e.g. communication interface 70-1) to send a location update request message, which is spread to the network including the communication interface in the Dormant Mode (communication interface 70-2) by the network including the communication interface in the Active Mode (communication interface 70-1).

Figure 8:
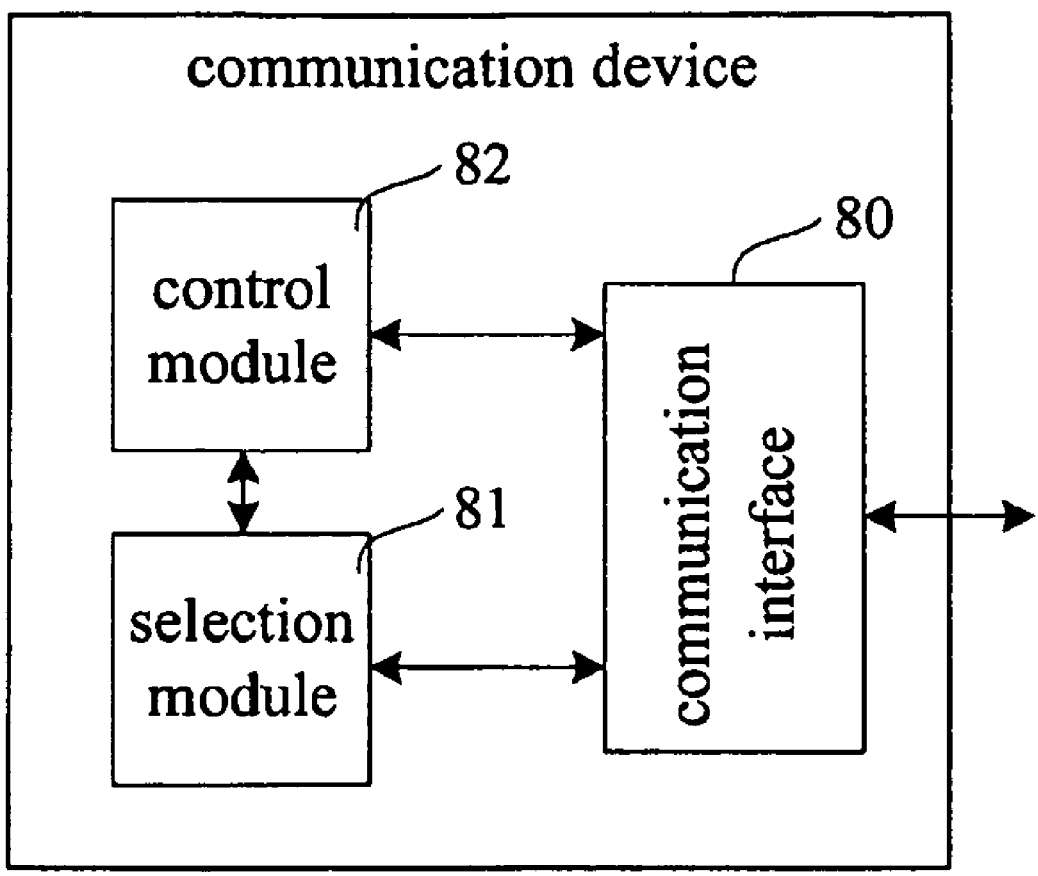
FIG. 8 is a structure schematic diagram of a network device according to an embodiment of the invention.

A network device including the DMC in the embodiment is shown in FIG. 8, including: a communication interface 80, a selection module 81, and a control module 82. The communication interface 80 performs data communication with other devices; the selection module 81 selects another network that uses a different wireless standard from that of the network where the terminal device is located when the selection module 81 determines the communication interface of the terminal device receiving data in the current network is in the Dormant Mode; the control module 82 controls the communication interface 80 to send an instruction message to the another network selected, and request the another network to execute the procedure of paging the terminal device.

After the network device has received a location update request from the terminal device, upon determining that the request should be processed by the another network, the control module 82 controls the communication interface 80 to send the location update request to the designated network. When the network device has received a request message to enter the Dormant Mode from a terminal device, the selection module 81 selects another network based on a policy, the control module 82 controls the communication interface to send a request message of entering the Dormant Mode to the another network. Thus, a number of communication interfaces may be allowed to enter the Dormant Mode through only one request message initiated by the terminal device. The request message for entering Dormant Mode can certainly be initiated at the network side as well.

A typical device shown in FIG. 8 is for example an access router, in which DMC is embedded.

The primitives for realizing MIPF by the paging controller in mobile terminals and networks are shown in Table 1:

| No. | Primitive | Service Category | Description |
| --- | --- | --- | --- |
| 1 | MI_P_ANN | Command Service | instruct all members in the paging area to page MS |
| 2 | MI_P_LU.REQ | Event Service | instruct MS to start location update |
| 3 | MI_P_LU.RSP | Event Service | response to the location update request |
| 4 | MI_P_ENTI.REQ | Command Service | instruct to enter the Dormant Mode |
| 5 | MI_P_ENTI.RSP | Command Service | response to the request of entering Dormant Mode |
| 6 | MI_P_EXII.REQ | Command Service | instruct to quit Dormant Mode |
| 7 | MI_P_EXII.RSP | Command Service | response to the request of exiting from Dormant Mode |
| 8 | MI_PM_NOTIFY | Event Service | notify the partner MS of the mode change |
| 9 | MI_P_QUERY | Event service | query the paging mode of ms in the designated network |

The primitives between the MIPF and its bottom layer in the embodiment are shown in Table 2:

| No. | Primitives | Service Category | Description |
| --- | --- | --- | --- |
| 1 | P_PM_NOTIFY | Event Service | Bottom layer notifies the upper layer of mode change. |
| 2 | P_PA_NOTIFY | Event Service | notify the upper layer of the paging area change |

In the DMC, the MIHF needs to store the location information of the mobile terminal. The information includes, but not limited to, the contents of Table 3:

| No. | Item | Description |
| --- | --- | --- |
| 1 | MS ID | unique ID of MS |
| 2 | MS MIHF ID | ID of the MIHF in MS |
| 3 | ID of Interface1 | a group attribute, including attributes of the succeeding interfaces. |
| 4 | ID of the network including Interface1 | |
| 5 | Type of the network including Interface1 | e.g., 3GPP, CDMA, or WIMAX |
| 6 | ID of the Paging area including Interface1 | Each interface has a paging area ID, paging area IDis only unique when combined with a network ID |
| 7 | anchor DMC ID associated with Interface 1 | ID of Anchor DMC in a network |
| 8 | anchor DMC MIHF ID associated with Interface 1 | ID of MIH of Anchor DMC |
| 9 | List of media specific parameters associated with interface 1 | |
| 10 | ID of Interface 2 | ... |
| ... | | ... |

Other parameter information of interface2 similar to Interface1 is not listed in Table 3. The number of interfaces may be more than 2.

The processing procedure is described in detail in the following by taking the system shown in FIG. 5 as an example, in which, the terminal device is equipped with communication interfaces of two types of media: Communication Interface 1 that communicates with Media1 and Communication Interface 2 that communicates with Media2.

Those skilled in the art should understand that messages sent between the DMC and terminal devices in a network or between DMCs in different networks need to be forwarded via another device. For the sake of simplification, the processing procedure for forwarding is omitted in the following procedure and the description of the Figures.

Figure 9:
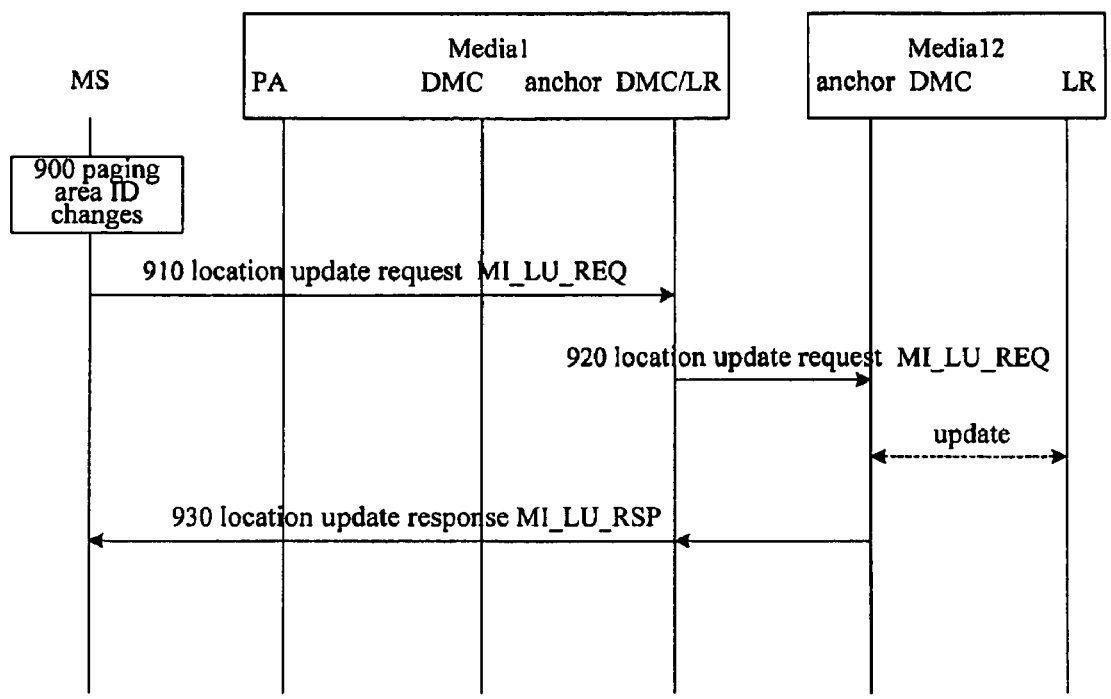
FIG. 9 is a flowchart of location updating according to an embodiment of the invention.

Referring to FIG. 9, a process of implementing the function of media independent location update is described, the communication interface 1 is in the Active Mode, and the communication interface 2 is in the Dormant Mode (also referred as Idle Mode):

At Step 900, the MIPF in the terminal device receives from the bottom layer a primitive P_PA_NOTIFY for notifying the perception of a change of the paging area in Media2. The primitive P_PA_NOTIFY triggers the MIPF to send a location update request through the MIH Event Service.

At Step 910, after detecting that the communication interface 2 is in the Dormant Mode, the terminal device sends a location update request message MI_LU_REQ to the Media1 network via the communication interface 1 in the Active Mode.

At Step 920, a device providing the functions of the MIH and MI-PAGING in Media1 delivers the location update request message MI_LU_REQ to the MIPF of the anchor DMC that is responsible for location information management the MIPF of the anchor DMC, based on MIPF ID specified in the message, forwards the location update request message MI_LU_REQ to a Media2 through the MIH Event Service (an interface IP in the message indicates the location update of Media2).

At Step 930, the anchor DMC that is responsible for location information management in Media2 updates the location information of the terminal device with the Location Register (LR may be inside the DMC, or may be separate, as desired), and sends a response MI_LU_RSP to the location update request message to the anchor DMC in Media1 through MIH Event Service, which is in turn sent to the terminal device by the anchor DMC in Media1.

As seen from the above processing procedure, the terminal device sends its location update information via the Media1 communication interface having already established a data link, and does not occupy the network resource of Media2.

Figure 10:
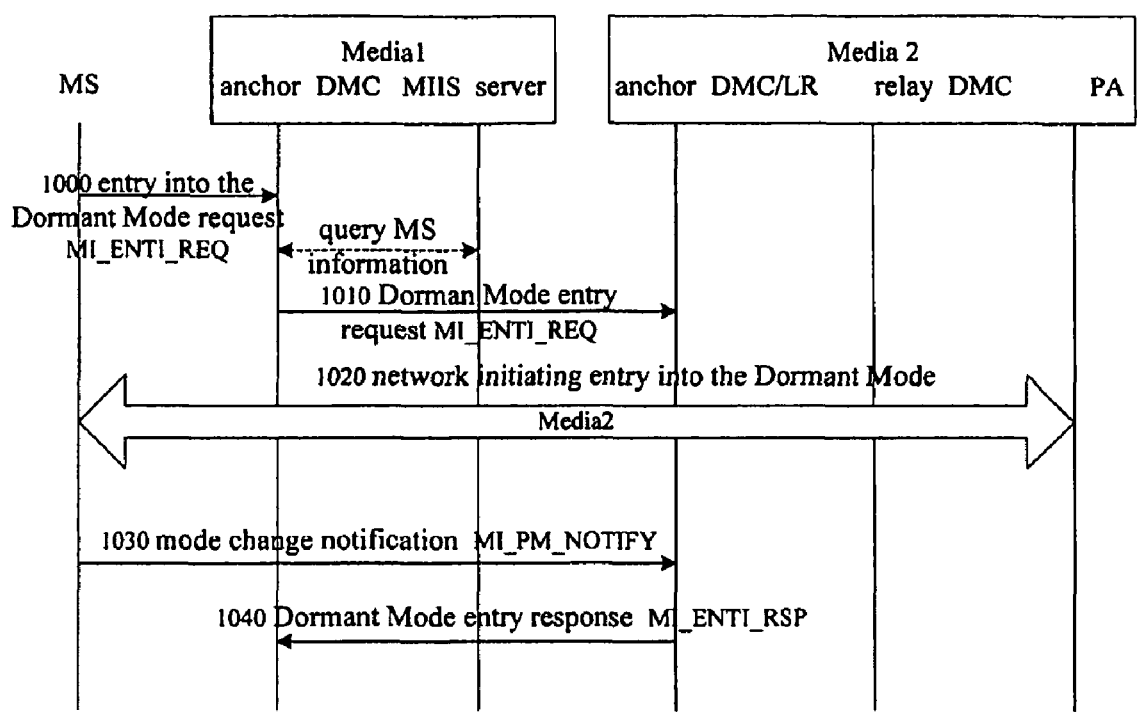
FIG. 10 is a flowchart of terminal device communicating to enter into a Dormant Mode according to an embodiment of the invention.

Referring to FIG. 10, a procedure for the terminal device initiating a request of entering dormancy and thus making other communication interfaces enter the Dormant Mode via one communication interface is as follows:

At Step 1000, the MIPF of the terminal device sends via the communication interface 1 to the Media1 a message MI_ENTI_REQ requesting a specified communication interface 2 (not limited to the specified Communication Interface 2 if there are more communication interfaces) to enter the Dormant Mode.

At Step 1010, a device providing the functions of the MIH and MI-PAGING in the Media1 delivers the message MI_ENTI_REQ to the anchor DMC that is responsible for location information management. the anchor DMC, based on the location information of MS in the local cache (as shown in Table3) (or by querying an MIH IS server, as shown by the dotted lines in the figure), obtains a list of networks including the interfaces requested to enter the Dormant Mode (in this example the list only consists of Media2, but there may be more, like Media3, etc), and forwards the message MI_ENTI_REQ to the networks in the list including all the selected communication interfaces, i.e., all the anchor DMCs in Media2.

At Step 1020, the anchor DMC in Media2 initiates a procedure of entering Dormant Mode in the wireless access network.

At Step 1030, when the communication interface 2 of the mobile terminal enters Dormant Mode, the bottom layer triggers a mode change notification message P_PM_NOTIFY, the MIPF sends a mode change notification message MI_P-M_NOTIFY by an MIH Event Server to inform the Media2 network of the change of the paging mode of the terminal device.

At Step 1040, the anchor DMC in Media2 updates the MS status information managed locally, updates the Communication Interface 2 from Active Mode to Dormant Mode, and sends a Dormant Mode entering response message MI_ENTI_RSP (i.e., the response to MI_ENTI_REQ) to the anchor DMC in Media1.

Figure 11:
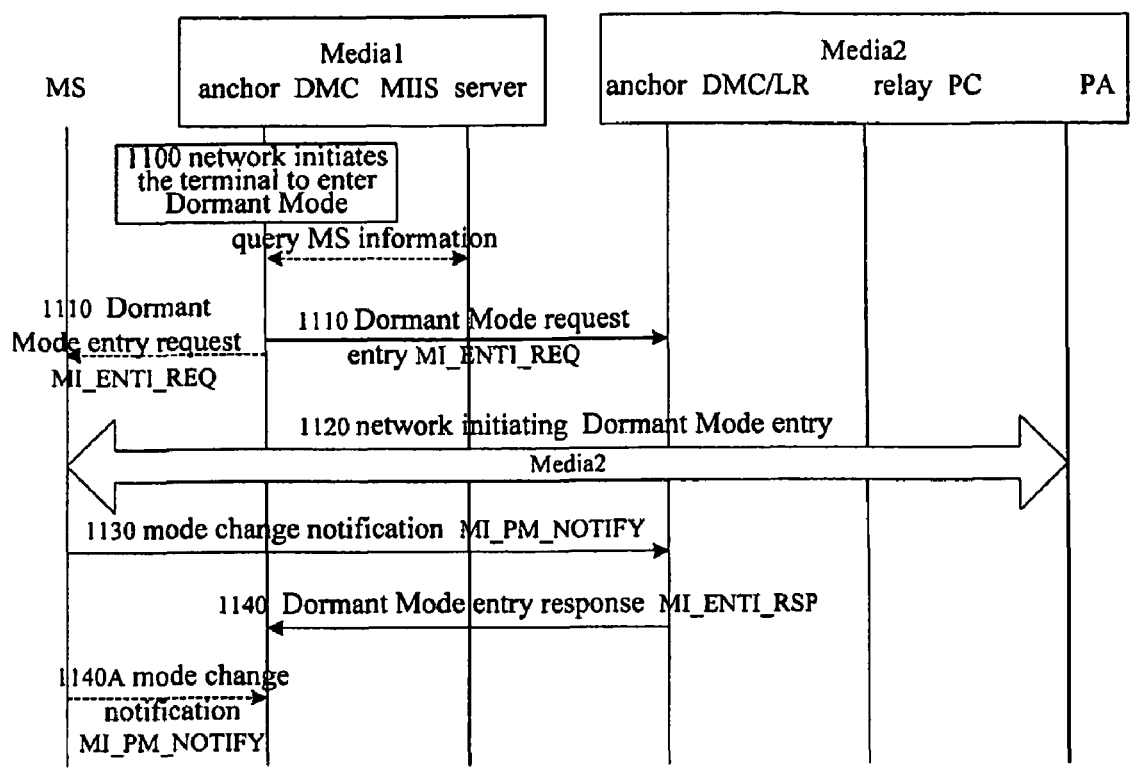
FIG. 11 is a flowchart of initiating entry into the Dormant Mode at a network side according to an embodiment of the invention.

Referring to FIG. 11, a processing procedure of initiating the request of entering Dormancy by the network to make communication interfaces of the terminal devices enter the Dormant Mode is as follows:

At Step 1100, a Media1 network instructs the communication interface 2 of the terminal device to enter the Dormant Mode. Based on the MS location information in the local cache (or by querying MIH IS server, as shown by the dotted lines in the figure), the anchor DMC of Media1 obtains interface resources of all the networks currently included by the terminal device, and determines one of the networks to send a request of entering dormancy MI_ENTI_REQ.

At Step 1110, the anchor DMC in the Media1 sends a request of entering dormancy MI_ENTI_REQ to the Media2.

Additionally, the anchor DMC in Media1 may also choose to send the request of entering dormancy MI_ENTI_REQ in the local network (i.e. step 110A).

At Step 1120, the anchor DMC in Media2 initiates a procedure of entering the Dormant Mode in the wireless access network.

At Step 1130, when the communication interface 2 of the mobile terminal enters Dormant Mode, the bottom layer triggers a mode change notification message P_PM_NOTIFY, and the MIPF sends a mode change notification message MI_PM_NOTIFY through the MIH Event Server to inform the Media2 network of the change of the paging mode of the terminal device.

If Step 1110A is performed, the procedure proceeds to Step 1140A at which a mode change notification message P_PM_NOTIFY is sent to the Media1 network via the communication interface 1. The anchor DMC of Media1 performs the corresponding procedure.

At Step 1140, the anchor DMC in Media2 updates the MS status information managed locally, updates the communication interface 2 from the Active Mode to the Dormant Mode, and sends a response of entering Dormant Mode MI_ENTI_RSP (i.e., the response to MI_ENTI_REQ) to the anchor DMC in Media1.

Figure 12:
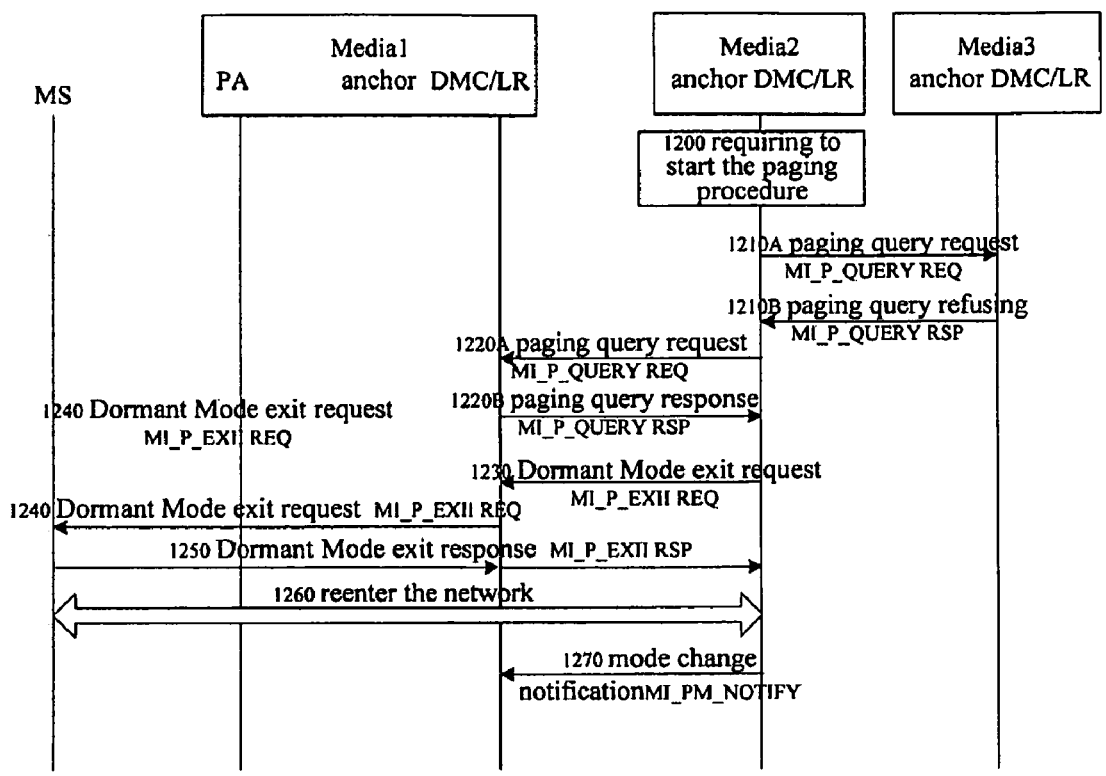
FIGS. 12 and 13 are flowcharts of performing paging across heterogeneous network according to an embodiment of the invention.

Referring to FIG. 12, a procedure of performing paging by querying one by one the connection modes of terminal devices at the network end is as follows.

At Step 1200, after the data sent to the terminal device in Media2 is sent to the anchor DMC, the anchor detects that the communication interface 2 corresponding to the terminal device is in the Idle Mode, and the MIPF needs starting the paging procedure. Based on the MS location information in the local cache (or by querying MIH IS server, as shown by the dotted lines in the figure), the anchor DMC obtains a list of networks available for the terminal device to access currently, including the Media1 and a Media3 (not shown in FIG. 5) in the example.

At Step 1210A, the anchor DMC in the Media2 sends a paging query request MI_P_QUERY REQ to the Media3.

At Step 1210B, after the anchor DMC in Media3 detects that the corresponding communication interface 3 is in the Dormant Mode, the anchor DMC sends a response of refusing the paging query request MI_P_QUERY RSP to the Media2. Other factors may result in the refusal.

At Step 1220A, the anchor DMC in Media2 sends a paging query request MI_P_QUERY REQ to the Media1.

At Step 1220B, the anchor DMC in Media1 detects that the corresponding Communication Interface 1 is in the Active Mode, and returns a paging query response MI_P_QUERY RSP to the Media2.

At Step 1230, the MIPF of the anchor DMC in Media2 sends a Dormant Mode exit request MI_P_EXIT REQ to Media1 through MIH Command Service to instruct the terminal device to wake up the Communication Interface 2.

At Step 1240, the anchor DMC in Media1 sends the Dormant Mode exit request MI_P_EXIT REQ to the terminal device.

At Step 1250, the terminal device sends a Dormant Mode exiting response MI_P_EXIT RSP to the anchor DMC in Media1, which is then sent by the anchor DMC in Media1 to the anchor DMC in Media2.

At Step 1260, the terminal device receives the Dormant Mode exit request MI_P_EXIT REQ at the communication interface 1, wakes up the communication interface 2. A wireless connection with Media2 for data transmission is reestablished through the communication interface 2.

At Step 1270, after the terminal device is reconnected to the network, the anchor DMC in Media2 sends a mode change notification message MI_PM_NOTIFY to the anchor DMC in Media1. The anchor DMC in Media1 then updates the information on the interface status of the terminal device's (MI_PM_NOTIFY is optional and can either be sent or not).

If a plurality of networks return response messages or all the networks return refusal messages after the query, Media2 can select one network (including itself) based on a predetermined policy to execute the paging procedure.

In the above procedure, the network end selects a network that is connected with the terminal device, and sends a Dormant Mode exit request message MI_P_EXIT REQ to the terminal device by unicast.

Those skilled in the art should know that in the procedure of FIG. 12, steps 1210A and 1220A indicate the procedure of the anchor DMC in Media2 sending messages, and that the sequence of sending the messages is not limited.

Figure 13:
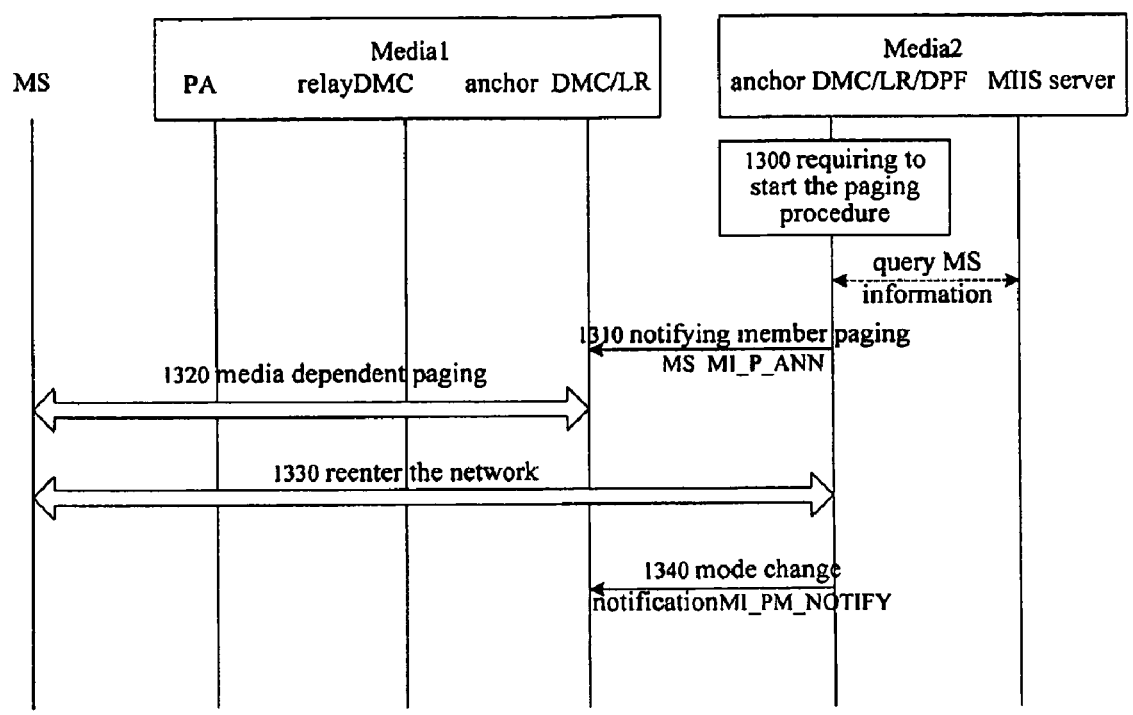

Referring to FIG. 13, a procedure of a network end selecting a network to perform the paging is as follows:

At Step 1300, after the data sent to the terminal device in Media2 is sent to the anchor DMC, the anchor DMC detects that the communication interface 2 corresponding to the terminal device is in the Idle Mode, and the MIPF starts the paging procedure. Based on the MS location information in the local cache (or by querying MIH IS server, as shown by the dotted lines in the figure), the anchor DMC obtains another target network Media1 that is the most available for the paging procedure and the target network information.

At Step 1310, the anchor DMC in Media2 sends a message MI_P_ANN notifying all the members in the paging area to the anchor DMC in Media1 to page the MS.

At Step 1320, the anchor DMC in Media1 detects that the corresponding communication interface 1 of the terminal device is in the Dormant Mode, and sends a paging message through media specific paging function.

At Step 1330, the terminal device receives the Dormant Mode exit request message MI_P_EXIT REQ at the communication interface 1, wakes up the communication interface 2. Thereby, a wireless connection with Media2 for data transmission is reestablished through the communication interface 2.

At Step 1340, after the terminal device is reconnected to the network, the anchor DMC in Media2 sends a mode change notification message MI_PM_NOTIFY to the anchor DMC in Media1, which then updates the information on interface status of the terminal device.

At step 1320, if the communication interface 1 of the terminal device is determined to be in the Active Mode, the subsequent paging procedure is the same as step 1230 and its subsequent steps in FIG. 12 (because Media2 can determine interfaces in the Active Mode via a query).

In the existing IP paging technology, location updates and paging messages are sent by IP messages, so communication interfaces are required to have capability to send IP messages, i.e. in the connected status. Communication interfaces in the Dormant Mode has to be waken up to establish connections. The embodiments of the invention send location updating messages and network-paging-terminal messages via network interfaces that are already connected and in the Active Mode, so that the resource consumption of the network interfaces in the Idle Mode is avoided.

In the embodiments of the invention, when the current network determines a communication interface of a terminal device is in the Dormant Mode, a paging message is sent to the terminal device via another network that uses a different wireless standard. Therefore, paging messages can be communicated without awakening the communication interface in the Dormant Mode to establish an IP connection at the wireless access side, which makes full use of link features and the framework provided by the existing MIH service, and alleviates workload of the terminal devices.

In the embodiments of the invention, when the terminal device needs to update its location information, if the corresponding communication interface is in the Dormant Mode, the terminal device selects another communication interface to send the location update request message. Therefore, location information can be communicated without awaking the communication interface in the Dormant Mode to establish an IP connection, and thus the load of the terminal device can be alleviated.

Power of multimode terminals and wireless load resource at the network side can be further saved when combining the embodiments of the invention and paging supported independently by various wireless access technologies.

Those skilled in the art can make modifications and variations based on the embodiments of the invention without departing from the spirit and scope of the disclosure. If the modifications and variations of the embodiments of the invention are within the scope of the accompanied claims and the equivalent technologies, then such modifications and variations are also intended to be included in the embodiments of the invention.

What is claimed is:

1. A method for paging a terminal device across heterogeneous networks, comprising:
   selecting, by a current network, another network to execute a paging procedure, when the current network, upon receipt of user data, determines that a communication interface of the terminal device in the current network is in a Dormant Mode, wherein the another network uses different wireless standards from the current network;
   sending, by the another network, a paging message to the terminal device to enable the terminal device to reconnect to the current network,
   sending, by a network where the terminal device is located, a request message to another network selected by the network, to instruct the terminal device to enter the Dormant Mode, wherein the another network uses different wireless standards from the network where the terminal device is located; and
   initiating, by the another network having received the request message of entering Dormant Mode, a procedure for enabling the corresponding communication interface of the terminal device to enter the Dormant Mode.

2. The method of claim 1, further comprising:
   instructing, by the terminal device, the communication interface to quit the Dormant Mode, enter an Active Mode after receiving the paging message, and establish a data link with the current network via the communication interface.

3. The method of claim 1, wherein, when the terminal device intends to update information on the location in a network, and the communication interface thereof corresponding to the network is detected to be in the Dormant Mode,
- selecting, by the terminal device, another communication interface to send a location update request; and
- sending, by a network receiving the location update request message, the location update request message to the network corresponding to the communication interface in the Dormant Mode for location update.

4. The method of claim 3, wherein the terminal device and the another network send messages related to the location update by using an MIH service.

5. The method of claim 1, further comprising: returning, by the another network, a response message of entering the Dormant Mode to the network sending the request message when the another network acquires a mode change of the communication interface.

6. The method of claim 1, further comprising:
- sending, by the current network, a paging message to other networks available for the terminal device to access, and selecting one network from the other networks returning response messages and sending to the selected one network a request message for instructing the communication interface of the terminal device corresponding to the current network to quit the Dormant Mode, wherein the selected one network sends the instruction message to the terminal device.

7. The method of claim 1, further comprising,
- selecting, by the current network, one network from other networks available for the terminal device to access, and sending to the selected one network a message notifying all the members in the paging area to page the terminal device;
- when the selected one network determines the communication interface of the terminal device in the selected one network is in the Dormant Mode, paging, by the selected one network, the terminal device with a media dependent paging function;
- or when the selected one network determines the communication interface of the terminal device in the selected one network is in the Active Mode, sending, by the selected one network, a request message to the terminal device using an MIH Command to request the communication interface of the terminal device corresponding to the current network to quit the Dormant Mode.

8. The method of claim 1, comprising:
- selecting, by the network, another network using different wireless standards from the network, based on location information of the terminal device recorded locally, or by querying an MIH Information Server.

9. A method for realizing entry into a Dormant Mode across heterogeneous networks, comprising:
- sending, by a current network, a request message to another selected network, to instruct a communication interface of the terminal device to enter the Dormant Mode, wherein the another network uses a different wireless standard from the current network; and
- initiating, by the another network having received the request message, a procedure for entering the Dormant Mode, to enable the communication interface of the terminal device to enter the Dormant Mode.

10. A network system, comprising:
- a network device adapted to select another network that uses a different wireless standard from a network where a terminal device is located when a communication interface of a terminal device receiving data in the network where the terminal device is located is determined to be in a Dormant Mode, and to instruct the another network to send a paging message; and
- the terminal device adapted to enable the communication interface to enter an Active Mode and reestablish a data link with a corresponding network when receiving the paging message,
- wherein the network device sends a request message to the other networks selected for instructing the terminal device to enter the Dormant Mode, wherein
- the other networks use different wireless standards from the network including the terminal device; the other networks having received the request message initiate a procedure for enabling a corresponding communication interface of the terminal device to enter the Dormant Mode.

11. The network system of claim 10, wherein,
when the terminal device needs to update location information in the network, if the corresponding communication interface is detected to be in the Dormant Mode, the terminal device selects another communication interface to send a location update request; the network device receiving the location update request delivers the location update request to the corresponding network.

* * * * *